United States Patent [19]

Ott

[11] Patent Number: 4,680,579
[45] Date of Patent: Jul. 14, 1987

[54] OPTICAL SYSTEM FOR PROJECTION DISPLAY USING SPATIAL LIGHT MODULATOR DEVICE

[75] Inventor: Granville E. Ott, Lubbock, Tex.

[73] Assignee: Texas Instruments Incorporated, Dallas, Tex.

[21] Appl. No.: 530,327

[22] Filed: Sep. 8, 1983

[51] Int. Cl.$^4$ .............................................. G09G 3/34
[52] U.S. Cl. ...................................... 340/783; 340/752; 340/795; 340/806; 340/810; 358/62; 358/89
[58] Field of Search ............... 350/171, 487, 607, 611, 350/608, 360, 1.1, 1.6, 600, 601, 642; 358/62, 233, 234, 89; 340/702, 795, 806, 810, 752, 783

[56] References Cited

U.S. PATENT DOCUMENTS

| | | | |
|---|---|---|---|
| 3,001,447 | 9/1961 | Ploke | 340/783 |
| 3,746,911 | 7/1973 | Nathanson et al. | 358/233 |
| 3,886,310 | 5/1975 | Guldberg et al. | 350/607 |
| 4,036,553 | 7/1977 | Borel et al. | 340/752 |
| 4,087,810 | 5/1978 | Hung et al. | 340/783 |
| 4,151,549 | 4/1979 | Bautze | 358/89 |
| 4,403,248 | 9/1983 | Velde | 358/62 |

FOREIGN PATENT DOCUMENTS 0081813 7/1981 Japan ....................... 350/1.1

Primary Examiner—Gerald L. Brigance
Assistant Examiner—Jeffery A. Brier
Attorney, Agent, or Firm—Carlton H. Hoel; Leo Heiting; Mel Sharp

[57] ABSTRACT

The projection display of the present invention employs a light source, a spatial light modulator such as a deformable mirror device having a plurality of individually electrically deformable mirror cells and Schlierin optics to project light from deformed mirror cells onto a viewing screen. An optical system forms light from the light source into a substantially collinear beam. A Schlierin optical device composed of alternating reflecting and transmitting portions is disposed at an angle to this beam. Light reflected or transmitted by the Schlierin optical device is focused by additional optics to a point near the deformable mirror device. Light reflected from undeformed mirror cells passes through the Schlierin optical device back to the light source. Deformed mirror cells reflect light at least in part to differing portions of the Schlierin optical device to follow a different path to a viewing screen. Control of the deformation of individual mirror cells thus enables control of illumination of corresponding spots on the viewing screen. A color picture may be formed using multiple deformable mirror devices and color filters. A three-dimensional image may be formed using multiple projection systems and a directionally reflecting screen or polarizing filters for differing deformable mirror devices with matching polarizing glasses.

16 Claims, 18 Drawing Figures

OPTICAL SYSTEM FOR PROJECTION DISPLAY USING SPATIAL LIGHT MODULATOR DEVICE

BACKGROUND OF THE INVENTION

The present invention is in the field of large scale graphic displays such as employed for small computer systems and terminals. The most common technique employed for displays for small computer systems or terminals is a cathode ray tube. In a cathode ray tube, a scanning electron beam having a varying current density is scanned across a light emitting phosphor screen. This light emitting phosphor screen is bombarded by the electron beam and generates light in proportion to the current density of the electron beam. Such displays have the advantage that they are a well known and well understood technology, generate their own light for viewing, can provide a good variation in gray tones and can also provide color. The cathode ray tube is disadvantageous in that it requires a large vacuum enclosing glass envelope which is consequently heavy and bulky. In addition, color producing cathode ray tubes are much more expensive than monochrome tubes and require relatively high driving voltages.

Another display technology used for small computer systems and terminals, especially for those systems which are hand portable or brief case portable, is a liquid crystal display. Each individual pixel within a graphic display has a single liquid crystal display cell which is individually electrically actuatable. These displays have the advantage that they are relatively flat and do not require large drive voltages. Liquid crystal displays are disadvantageous in that they are temperature sensitive, difficult to produce in large sizes, require external light sources for viewing, require a large number of drive lines and extensive drive circuitry and can provide only limited gray scale or color capacity.

Due to the decrease in size and the increase in capacity of small computer systems and terminals, the need for a low cost, high resolution, flexible graphic display device to be employed with these systems is increasing. The prior display technologies such as cathode ray tubes or liquid crystal devices each have disadvantages which preclude them from being ideal for these applications.

SUMMARY OF THE INVENTION

An object of the present invention is to provide a light emitting display system which may be folded into a brief case portable enclosure such may be employed in portable computer systems or portable terminals.

It is an object of the present invention to employ a spatial light modulator such as a semiconductor deformable mirror device in conjunction with a Schlierin optical system to modulate the light emitted from a light source onto a viewing screen. A Schlierin optical device employs alternating reflecting and transmitting bands disposed in a collinear beam of light. Light from either the reflecting or transmitting path of the Schlierin optical device is focused upon the deformable mirror device. The Schlierin optical device and the deformable mirror device are disposed so that light reaching undeformed mirror cells is reflected back to the light source. Light reaching deformed mirror cells, however, follows another path to illuminate a spot on a viewing screen.

It is a further object of the present invention to employ plural light paths with plural spatial light modulator devices and color filters in order to provide a color display on the viewing screen.

It is a still further object of the present invention to provide a three-dimensional image. This is accomplished by providing a differing image to each of the viewer's eyes. Two projection systems may be employed with small screens viewable by individual eyes. In the alternative, two projection systems may be employed with a directionally reflecting screen so disposed to direct the light from the two projection systems to differing eyes of the viewer. In a still further embodiment, differing polarizing filters between the Schlierin optical device and separate spatial light modulator devices together with corresponding polarizing filters in viewing glasses provide a differing image to the viewer's eyes.

BRIEF DESCRIPTION OF THE DRAWINGS

The above-noted objects of this invention and other objects will become apparent from the following detailed description and claims when read in conjunction with the accompanying drawings wherein:

DETAILED DESCRIPTION OF THE PREFERRED EMBODIMENTS

The novel aspects of the present invention will now be described in conjunction with the drawings FIGS. 1 to 18. FIGS. 1 to 7 illustrate various embodiments of the optical system in accordance with the present invention. FIGS. 8 to 14 illustrate the overall structure and the manner of construction and operation of the deformable mirror devices illustrated in FIGS. 1, 5 and 7. FIGS. 15 to 18 illustrate various embodiments of the construction of the present invention.

Figure 1:
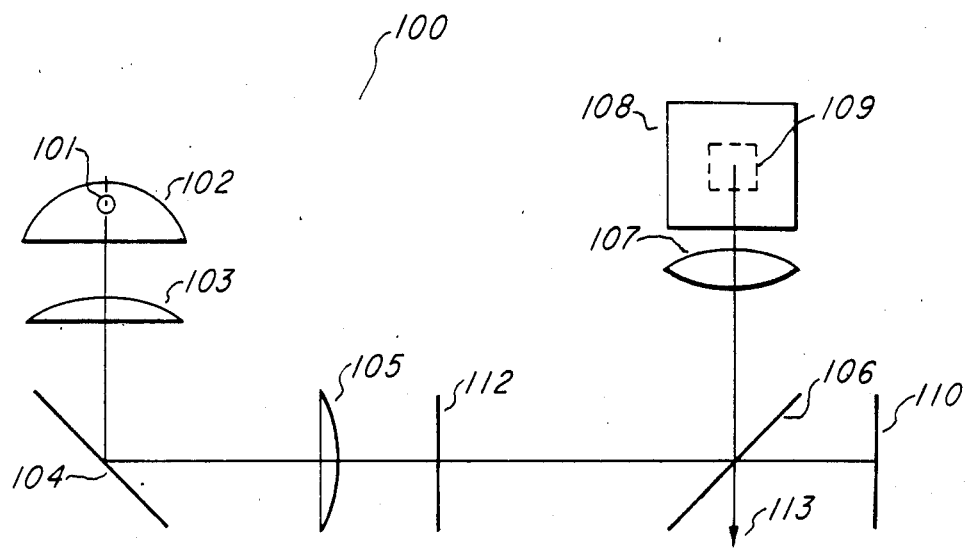
FIG. 1 illustrates an optical system in accordance with a monochrome embodiment of the present invention.

FIG. 1 illustrates optical system 100 in accordance with one embodiment of the present invention. Light is emitted by light source 101. Light emitted by light source 101, which is preferably an electric light bulb, is formed into a substantially collinear beam by parabolic mirror 102, lens 103, cold mirror 104 and lens 105. Cold mirror 104 is constructed according to well known principles to reflect substantially all the visible light while transmitting infrared light. This reduces the heating of deformable mirror device 109 by incident light by removing the infrared light portion of the light emitted by light source 101. As will be understood from the explanation below, the angle at which Schlierin optical device 106 receives light from light source 101 may be adjusted in order to bring about the desired arrangement of parts.

Figure 2:
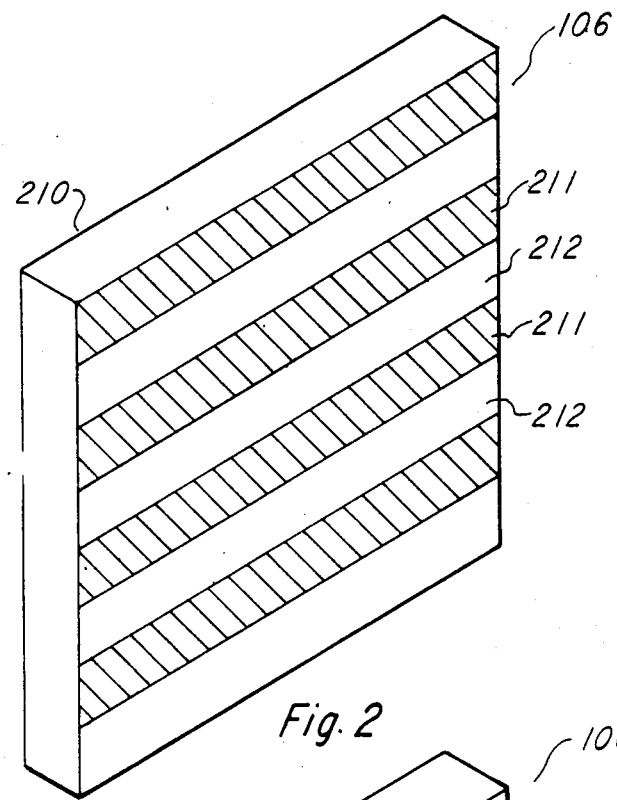
FIGS. 2 and 3 illustrate the construction of embodiments of the Schlierin optical device employed in the optical system of the present invention.
Figure 3:
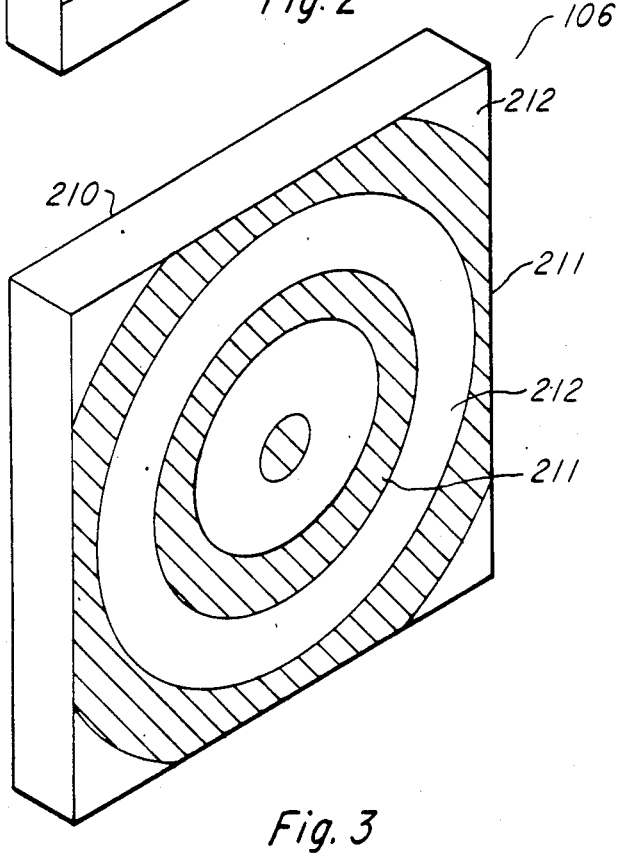

Two embodiments of a Schlierin optical device 106 are illustrated in FIGS. 2 and 3. Schlierin optical device 106 illustrated in FIG. 2 includes transparent plate 210 which is coated with a plurality of mirrored surfaces 211. As will be explained in greater detail below, it is preferable that mirrored surfaces 211 are reflecting on both faces, that is, the external face away from transparent plate 210 and the internal face adjacent to transparent plate 210. When placed across the beam from lens 105, Schlierin optical device 106 reflects some of the light from reflecting portions 211 and transmits other portions of this light through transmitting portions 211. This serves to divide the light beam into two parts.

FIG. 3 illustrates an alternative embodiment of Schlierin optical device 106. In FIG. 3, reflecting portions 211 are formed in concentric circles upon transparent plate 210. This also causes the formation of transmitting portions 212 in similar concentric circles.

Referring back now to FIG. 1, those portions of the light from light source 101 which fall upon the reflecting portions of Schlierin optical device 106 reach lens 107. Lens 107 focuses these rays near but not at deformable mirror device 109. The deformable mirror device 109 is not disposed at the focal point of lens 107 which is in order to form a focused image upon a viewing screen located at less than infinity. At the same time mirror 102, lens 103 and lens 105 are constructed to defocus the image of light source 101 falling upon deformable mirror device 109.

Figure 4:
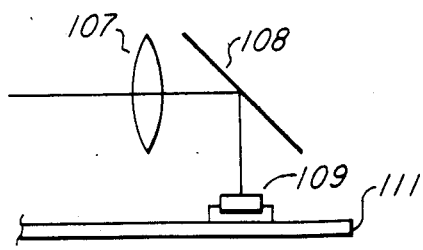
FIG. 4 illustrates a cross-sectional view of the construction of a lens, mirror and deformable mirror device employed in the present invention.

FIG. 4 illustrates lens 107, mirror 108 and deformable mirror device 109 from a differing angle. Light coming from Schlierin optical device 106 passes through lens 107 and is reflected from mirror 108 onto deformable mirror device 109. As explained above, deformable mirror device 109 is near but not at the focal point of lens 107. The arrangement of parts illustrated in FIG. 4 enables deformable mirror device 109, which is preferably constructed as an integrated circuit semiconductor device, to be physically and electrically mounted upon printed circuit board 111. Thus, the use of mirror 108 enables deformable mirror device 109 to be mounted on printed circuit board 111 in a conventional manner, therby simplifying the electrical connections to deformable mirror device 109.

The preferred embodiment of the spatial light modulator in the present invention is a single chip deformable mirror device. As will be more fully described below, deformable mirror device 109 includes a plurality of individually deformable mirror cells. In their quiescent, undeformed state, each mirror cell of deformable mirror device 109 acts as a plane mirror to reflect the light received from lens 107 back along substantially the same path to fall again upon the corresponding reflecting portions of Schlierin optical device 106. These rays reflected from the undeformed mirror cells of deformable mirror device 109 are then focused by lenses 103 and 105 and parabolic mirror 102 back upon the light source 101. Because it is believed that light losses throughout the optical system 100 would be relatively great, nonreciprocal optical device 112 may be placed within the path between Schlierin optical device 106 and light source 101. Nonreciprocal optical device 112 is a half silvered mirror or a coated transparent plate which preferentially transmits and reflects light. Nonreciprocal optical device 112 transmits more light from light source 101 than it reflects back to light source 101. In addition, nonreciprocal optical device 112 also reflects back more light from Schlierin optical device 106 than it transmits to light source 101. By this means, the nonreciprocal optical device 112 recaptures some of the light reflected from the quiescent or undeformed mirror cells of deformable mirror device 109 and places them back into the useful light path.

Plane mirror 110 is disposed in the transmitting light path from Schlierin optical device 106. Mirror 110 is aligned to act like undeformed mirror by reflecting light back to transmitting portions of Schlierin optical device 106 and hence to nonreciprocal optical device 112. This enable recapture of the portion of light not reaching deformable mirror device 109.

The optical system 100 becomes useful when light from light source 101 falls upon a deformed mirror cell of deformable mirror device 109. Light which falls upon such a deformed mirror cell deviates from the incoming path and thus this light falls at least in part upon transmitting portions of Schlierin optical device 106. The light thus reflected passes through Schlierin optical device 106 and follows path 113 to a viewing screen (not shown).

It should be understood that placement of deformable mirror device 109 in the reflecting path of Schlierin optical device 106 is not mandatory. The optical system 100 would work equally well if deformable mirror device 109 is placed in the transmitting path of Schlierin optical device 106. In such an event, light reflected from undeformed mirror cells would follow a path back through transmitting portions of Schlierin optical device to light source 101 (or nonreciprocal optical device 112 if provided). Light reflected from deformed mirror cells would fall at least in part upon reflecting portions 211 of Schlierin optical device and would be reflected via path 113 to the viewing screen. If this optional construction is adopted, then plane mirror 110 may be provided as an option in the reflecting path to recover otherwise wasted light as described above.

Optical system 100 is employed as described above in order to project onto a viewing screen only light reflected from deformed mirror cells of deformable mirror device 109. It should be clear from the above explanation, that individual mirror cells when deflected would reflect light to a corresponding portion of the viewing screen. Therefore, by electrical control of the deformation of the individual cells within deformable mirror device 109, a small spot corresponding to the mirror cell may be illuminated or nonilluminated on the viewing screen. It should also be noted that deformable mirror device 109 may be constructed so that each mirror cell may have more than one deformed state. This is advantageous because the deformed states of each mirror cell of deformable mirror device 109 may be constructed so that they reflect differing amounts of light onto the transmitting portions of the Schlierin optical device 106. Thus, the illuminated spot corresponding to the individual deformable mirror cell on the viewing screen may be illuminated with differing intensity. This can thus provide a gray scale enabling a set of illuminating intensities from black (nonilluminated) to white (fully illuminated).

Figure 5:
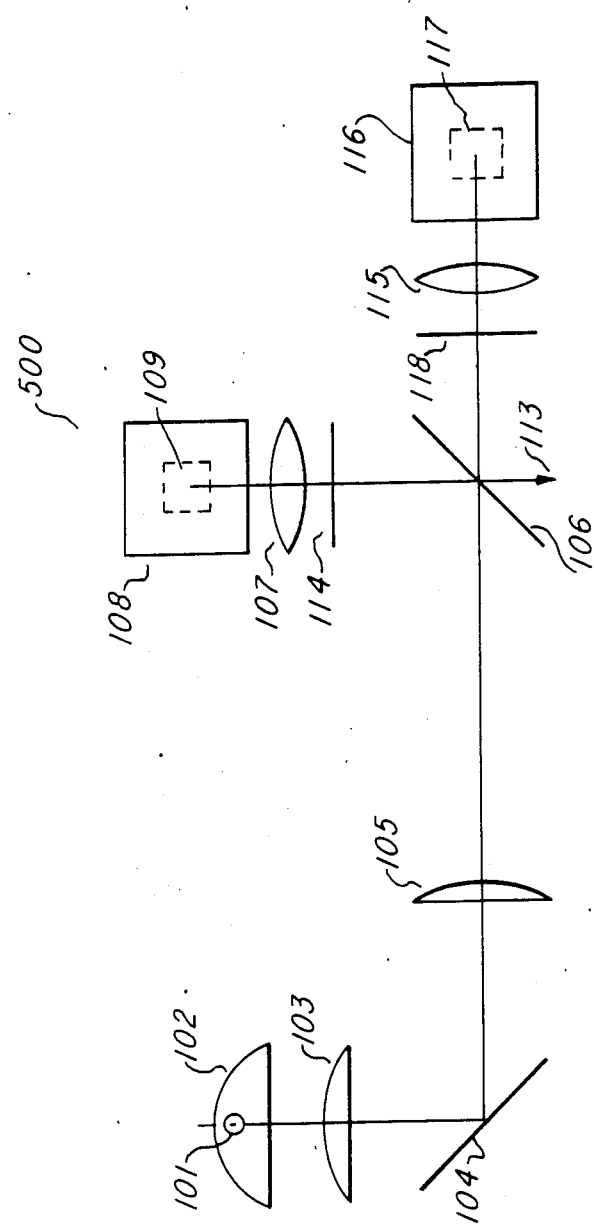
FIG. 5 illustrates an optical system in conjunction with a two color or two deformable mirror device embodiment of the present invention.

FIG. 5 illustrates optical system 500 in accordance with a further embodiment of the present invention. It should be noted that like parts appearing in FIGS. 1 and 5 have like reference numerals. FIG. 5 differs mainly from FIG. 1 in the addition of lens 115, mirror 116 and deformable mirror device 117 in the optical path of rays transmitted through Schlierin optical device 106. These rays are orginally transmitted by transmitting portions 212 of Schlierin optical device 106. These transmitted rays fall upon lens 115 and are thus focused to a point. Disposed near but not at the focal point of lens 115 (as reflected by mirror 116) is deformable mirror device 117, which may be constructed in the same manner as deformable mirror device 109. Lens 115, mirror 116 and deformable mirror device 117 are arranged in a manner similar to lens 107, mirror 108 and deformable mirror device 109 illustrated in FIG. 4. Deformable mirror devices 109 and 117 are preferably mounted on a single printed circuit board 111.

Because of this arrangement of additional parts, undeformed mirror cells of deformable mirror device 117 reflect light back to their corresponding transmitting portions 212 of Schlierin optical device 106. The light thus reflected from undeformed mirror cells of deformable mirror device 117 thus returns to source 101. However, light reflected from deformed mirror cells of deformable mirror device 117 fall at least in part upon reflecting portions 211 of Schlierin optical device 106. This light follows path 113 to the viewing screen. Thus, in a case similar to the case of deformable mirror device 109, light falling upon undeformed mirror cells of deformable mirror device 117 do not reach the viewing screen. Light falling upon deformed mirror cells of deformable mirror device 117 illuminate a corresponding spot of the viewing screen. As in the case of deformable mirror device 109, deformable mirror device 117 preferably has a plurality of deformed states for each of its mirror cells for reflecting differing amounts of light onto the corresponding spot of the viewing screen. Thus, optical system 500 enables useful employment of the substantial portion of the light from light source 101 which is transmitted by Schlierin optical device 106 and would otherwise not be available for any useful purpose. If the Schlierin optical device 106 has approximately one half of its area as transmitting portions and one half of its area as reflecting portions, then the optical system 500 enables useful modulation of approximately fifty percent of the light falling upon Schlierin optical device 106 which would otherwise not be modulated.

It should be clearly noted that the particular angle of Schlierin optical device 106 illustrated in FIG. 5 is not required for the coincidence of the light paths to screen from deflected mirror cells of deformable mirror devices 109 and 117. Because of the reciprocal nature of the reflections from Schlierin optical device 106, the light from deflected mirror cells of deformable mirror devices 109 and 117 will always follow path 113 to the viewing screen regardless of the angle of Schlierin optical device 106 to the light received from light source 101.

Optical system 500 also illustrates a manner in which a color display may be obtained. Optical system 500 illustrates color filters 114 and 118. By providing these color filters 114 and 118 in differing primary colors, a combination of these two primary colors may be displayed upon the viewing screen. With the provision of differing amounts of deflection for providing differing levels of illumination at a particular spot of the viewing screen, this combination could provide a quite pleasing color display. It should be understood that the position of color filters 114 and 118 illustrated is not mandatory. The color filters may be disposed in any convenient location between Schlierin optical device 106 and the corresponding deformable mirror device.

In addition, it is possible with a suitable compromise to provide a full color display from optical system 500 illustrated in FIG. 5. Firstly, one of the color filters 114 and 118 is green for providing a display of the primary color green. The other of the color filters 114 and 118 is provided in a combination of the other primary colors of red and blue. This combination may be either a checkerboard pattern of alternating red and blue squares or a pattern of alternating red and blue stripes. It is known in the color camera art that the green color signal is a close approximation of the luminance signal. It is also known that the spatial data necessary for a satisfactory full color display is not as great for the red and blue primary colors as for the green primary color. Therefore, if the signal to the deformable mirror device having the two color filter is an appropriate combination of the red and green primary color ssignals, then it is possible to provide a good full color display from the optical system 500 illustrated in FIG. 5.

The optical system 500 illustrated in FIG. 5 may be employed in a different manner than described above with the elimination of color filters 114 and 118. It is possible that deformable mirror devices 109 and 117 are so aligned that the spots on the display screen corresponding to individual mirror cells and deformable mirror devices 109 and 117 overlap. In such a case, a gray scale having a greater number of light variations is provided. However, deformable mirror devices 109 and 117 may be aligned differently in order to increase the visual resolution achievable in one of the two dimensions of the viewing screen.

Figure 6:
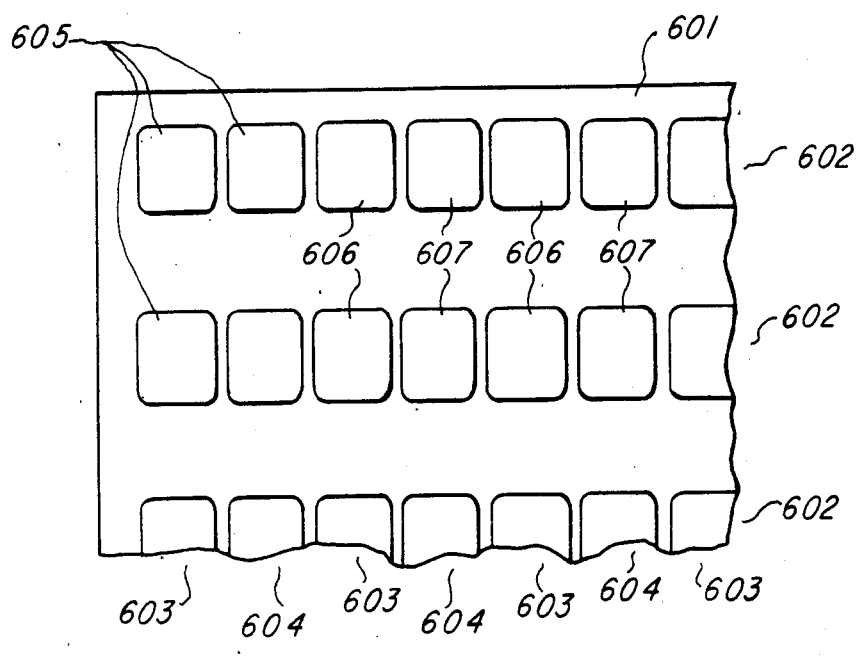
FIG. 6 illustrates the arrangement of screen spots in accordance with an embodiment of the present invention.

FIG. 6 illustrates a portion of viewing screen at 601 having a plurality of pixel areas 605 corresponding to individual mirror cells within deformable mirror devices 109 and 117. These individual pixels 605 are disposed in rows 602, odd columns 603 and even columns 604. The individual mirror cells of deformable mirror devices 109 and 117 are disposed in evenly spaced rows and columns. Deformable mirror devices 109 and 117 are aligned so that the pixels 605 corresponding to rows of mirror cells within deformable mirror devices 109 and 117 correspond to rows 602. The deformable mirror devices 109 and 117 are disposed so that the pixels 605 corresponding to the columns of mirror cells are not aligned. In particular, one of the deformable mirror devices 109 or 117 is aligned to controllably illuminate pixels 606 disposed in odd columns 603. The other of the deformable mirror devices is aligned to conditionally illuminate pixels 607 disposed in even columns 604.

The advantage of this alignment of the deformable mirror devices 109 and 117 is the increase in resolution provided in each one of rows 602 by the provision of twice as many row pixels as column pixels. It should be fully understood that this relationship of pixels could be changed to provide more pixels in each column than in each row.

The above-described alignment of pixels corresponding to individual mirror cells of deformable mirror devices 109 and 117 is preferably employed with a Schlierin optical device such as illustrated in FIG. 2. It has been found that the edges between reflecting portions 211 and transmitting portions 212 cause a decrease in the resolution achievable due to slight diffraction at these edges. When employing the offset pixel technique described above, it is preferable that the stripes of reflecting and transmitting portions of Schlierin optical device 106 are disposed so that the edges between these transmitting and reflecting portions do not degrade the resolution in the high resolution axis thereby upsetting the interleaved spot positions. Thus, for example, horizontally disposed stripes such as illustrated in FIG. 2 are preferable in the case in which the high resolution axis is the horizontal axis and the low resolution is the vertical axis. Similarly, it is preferable to provide vertical stripes, by rotating the Schlierin optical device illustrated in FIG. 2 by ninety degrees, in the event that the high resolution axis is the vertical axis and the low resolution is the horizontal axis such as illustrated in FIG. 6.

Figure 7:
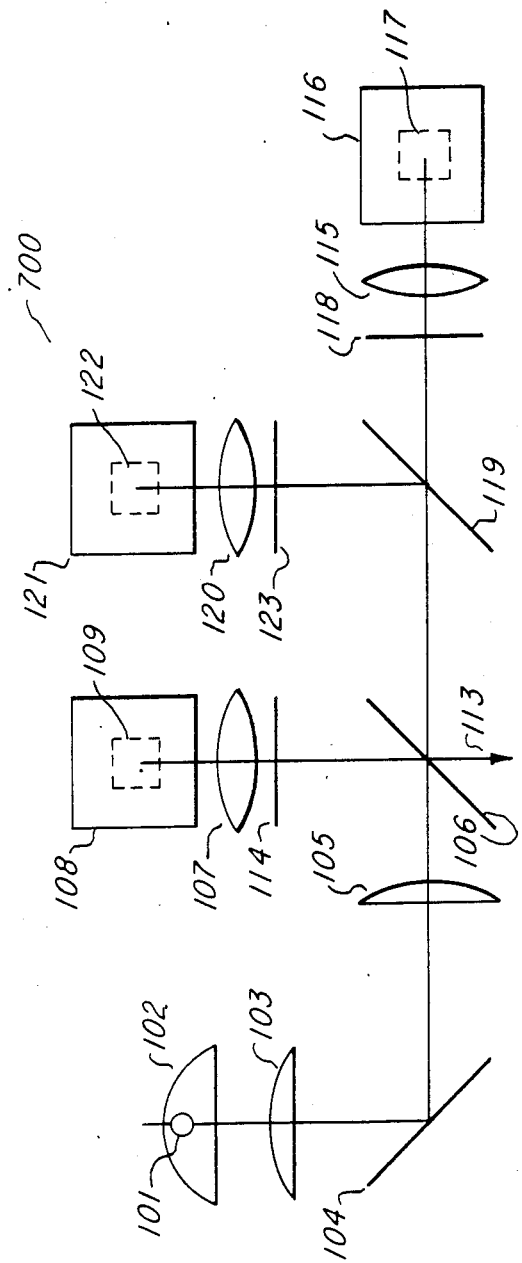
FIG. 7 illustrates an optical system in accordance with a three color embodiment of the present invention.

FIG. 7 illustrates optical system 700 by which a full color display may be generated. FIG. 7 illustrates beam splitter 119 located in the transmitting optical path of Schlierin optical device 106. Light transmitted through Schlierin optical device 106 falls upon beam splitter 119 which may be a half silvered mirror. In accordance with known optical principles, approximately half the light is transmitted through beam splitter 119 to lens 115. Lens 115 focuses this light to a point. Deformable mirror device 117 is disposed at a position near but not at the focal point of the lens 115. This light path also includes color filter 118 and mirror 116.

The other half of the light falling upon beam splitter 119 is reflected to lens 120. Lens 120 focuses this light to a point. Disposed near but not at the focal point of the lens 120 is deformable mirror device 122. Also in this light path is color filter 123 and mirror 121. Also note that lens 107, color filter 114, mirror 108 and deformable mirror device 109 appear in the reflecting path from Schlierin optical device 106 as similarly illustrated in FIGS. 1 and 5.

Optical system 700 as illustrated shows how deformable mirror devices 109, 117 and 122 may be employed with respective color filters 114, 118 and 123 in order to provide a full color display at the viewing screen. Each of the three color filters 114, 118, and 123 is in one of the three primary colors red, blue and green. In accordance with the principles outlined above, the deformation of one of the mirror cells in deformable mirror devices 109, 117 and 122 causes the display of light at a corresponding spot on the viewing screen. Because of the color filters 114, 118 and 123, the corresponding spot on the viewing screen is illuminated in the color of the corresponding color filter. By application of the corresponding red, blue and green chrominance signals to deformable mirror devices 109, 117 and 122, a full color display may be provided at the viewing screen.

Note that although beam splitter 119 is illustrated in FIG. 7 as being in the path of light transmitted through Schlierin optical device 106, it would be obvious to those skilled in the art that beam splitter 119 could be placed in the reflecting path. Thus for example, beam splitter 119, lenses 115 and 120, mirrors 116 and 121 color filters 118 and 123 and deformable mirror devices 117 and 122 may be disposed in the reflected light path instead of lens 107, mirror 108, filter 114 and deformable mirror device 109. In such an event, lens 107, mirror 108, color filter 114 and deformable mirror device 109 would be placed in the transmitting path of Schlierin optical device 106.

Figure 8:
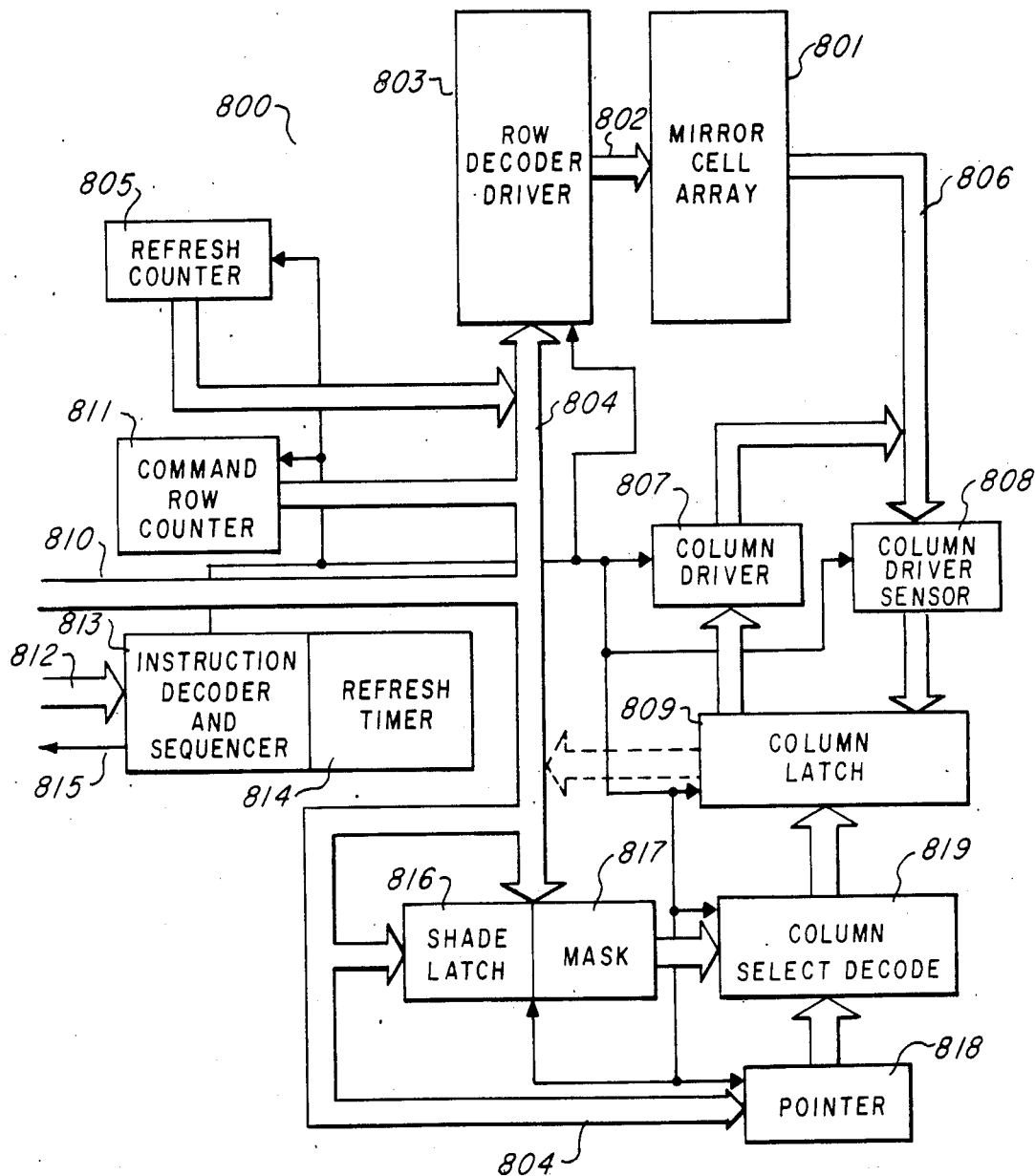
FIG. 8 illustrates the circuits disposed upon the single chip deformable mirror device in accordance with another embodiment of the present invention.

The preferred embodiment of the spatial light modulator employed is a deformable mirror device having a plurality of mirror cells and drive electronics formed on a single integrated circuit chip. FIG. 8 illustrates a block diagram 800 of the deformable mirror devices illustrated in FIGS. 1, 5 and 7. Block diagram 800 includes a mirror cell array 801 which is a matrix of a plurality of individual mirror cells disposed in rows and columns. In accordance with a preferred embodiment of the present invention, the mirror cell array 801 includes 200 rows of 256 columns of individual mirror cells. The construction of mirror cell array 801, in particular the construction of the individual mirror cells, is disclosed below in conjunction with FIGS. 9 to 12.

A plurality of row conductors 802 connect mirror cell array 801 to row decoder driver 803. As stated above, in the preferred embodiment there are 200 row conductors 802. Row decoder driver 803 receives a multiple bit digital signal from data bus 804 and provides an output on a selected one of the row conductors 802. In the preferred embodiment, data bus 804 consists of eight bits which are applied to row decoder driver 803 to specify the particular row conductor 802 to be driven. It should be noted that since eight bits can specify up to 256 items, there are some excess codes in these eight bits.

Refresh counter 805 is also connected to data bus 804. Refresh counter 805 is employed to store an indication of the next row of mirror cell array 801 to be refreshed. The manner of row refresh employing refresh counter 805 is further detailed below.

Also extending from mirror cell array 801 are a plurality of column conductors 806. In accordance with the preferred embodiment noted above, there are 256 individual column conductors 806. Each of the column conductors 806 is connected to column driver 807. Column driver 807 produces a signal on each of the column conductors 806. In conjunction with row decoder driver 803, the signals applied by column driver 807 are applied to each mirror cell within a selected row of mirror cell array 801. As will be more fully explained below in conjunction with the description of individual mirror cells, each such mirror cell is a charge storage device. The magnitude of the signal from column driver 807 applied to the column conductors 806 determines the amount of charge stored in the individual mirror cells of the selected row. The amount of deformation of the mirror of each individual mirror cell is a function of the amount of charge stored in that mirror cell.

Also connected to each of column conductors 806 is column sensor 808. In conjunction with the individual row 802 selected by row decoder driver 803, column sensor 808 senses the magnitude of the charge on each mirror cell in the selected row. As will be more fully explained below, column sensor 808 is employed in a self-refresh of the data to be displayed via deformable mirror device 800.

Both column driver 807 and column sensor 808 are coupled to column latch 809. In accordance with the present invention, data corresponding to the charge stored in the mirror cells on a selected row are sensed by column sensor 808 and then stored within column latch 809. Later this data from column latch 809 is applied to column driver 807 to be applied to the individual mirror cells in each column of a row selected by row decoder driver 803 within mirror cell array 801. This system is employed in a self-refresh of mirror cell array 801, enabling the display derived from deformable mirror device 800 to be preserved without requiring constant update from an external source.

In conjunction with a preferred embodiment of the present application, each mirror cell in an individual row may be driven in four states, a quiescent undeformed state and three deformed states reflecting differing amounts of light onto the viewing screen. In this regard, column latch 809 preferably includes a two bit memory for each of the 256 elements in an individual row within mirror cell array 801. Thus, column driver 807 includes a two bit digital to analog converter coupled to each of the column conductors 806. That is, in accordance with two bits of data from a corresponding memory within column latch 809, column driver 807 drives an individual column conductor 806 to one of four voltages.

Also in accordance with the preferred embodiment of the present invention, column sensor 808 includes a two bit analog to digital converter connected to each of the column conductors 806. Column sensor 808 senses the analog charge levels stored within each mirror cell within a selected row of mirror cell array 801 and generates a two bit code for storage within column latch 809 corresponding to the four permissible states of the charge within the corresponding mirror cell. Note that in order to provide the self-refresh function column, sensor 808 must be able to distinguish the four permissible charge states after some decrease in charge level due to leakage.

Deformable mirror device 800 is responsive to external signals applied by a data port 810 which is coupled to data bus 804 and instruction bus 812 which is coupled to instruction decoder and sequencer 813. Data port 810 is coupled to row decoder driver 803, shade latch 816, mask 817 and pointer 818 via bus 804. The exact operations of the deformable mirror device 800 under instruction control will be detailed below, however, a brief outline of this is given here. In response to the particular instruction received on instruction bus 812 and decoded by a instruction decoder and sequencer 813, data from data port 810 may be applied to row decoder driver 803 in order to select one of the rows of mirror cell array 801, applied to shade latch 816 and mask 817 in order to designate the data type, applied to pointer 818 in order to designate the column start location for data entry within column select decode 815 or applied through shade latch 816 and mask 817 via column select decode 819 to column latch 809. These operations occur alternately with an automatic refresh operation under control of instruction decoder and sequencer 813. Instruction decoder and sequencer 813 also includes a busy line 815 which is used to communicate to external circuits that the deformable mirror device is performing overhead tasks and will be unresponsive to instructions received on instruction bus 812.

Figure 9:
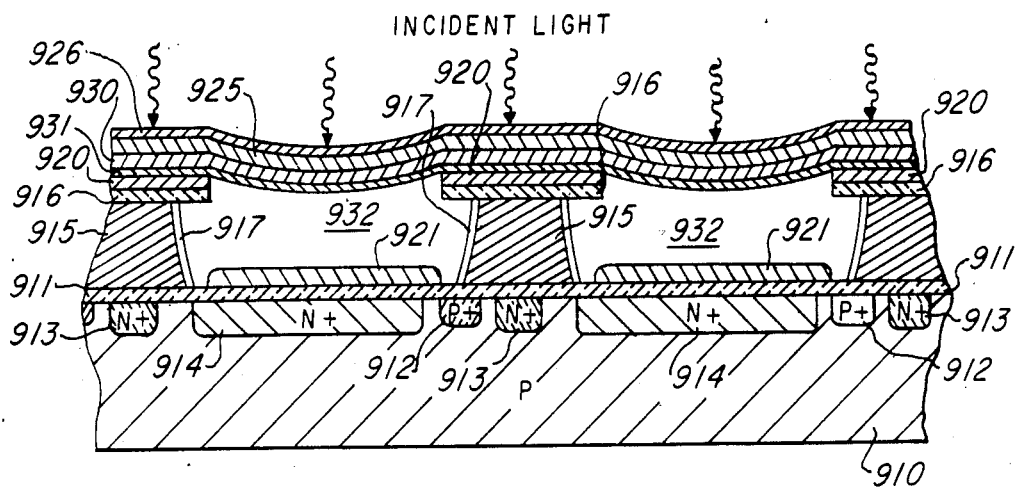
FIG. 9 illustrates the construction of a mirror cell in accordance with an embodiment of the present invention.
Figure 10:
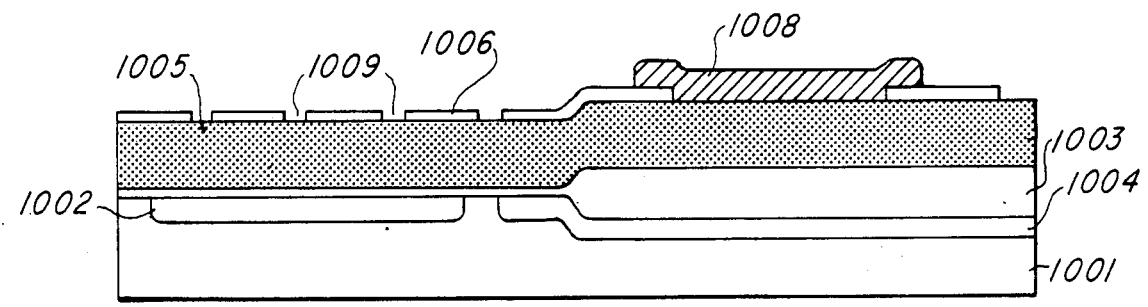
FIGS. 10, 11 and 12 illustrate the construction of a mirror cell in conjunction with an alternative embodiment of the present invention.
Figure 11:
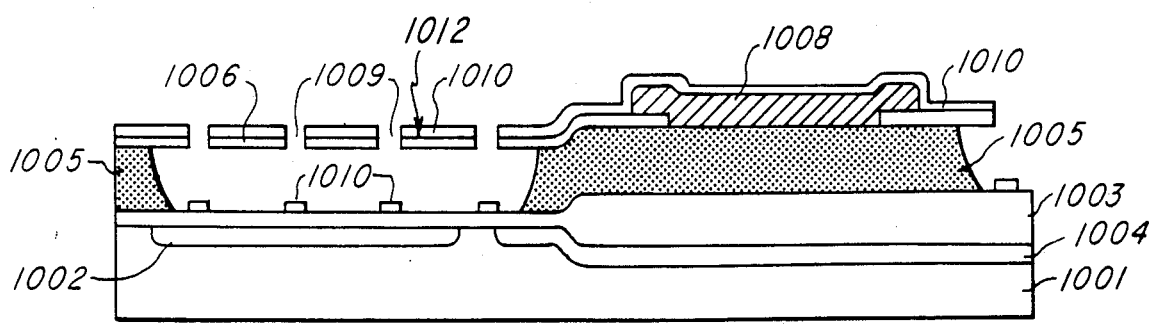
Figure 12:
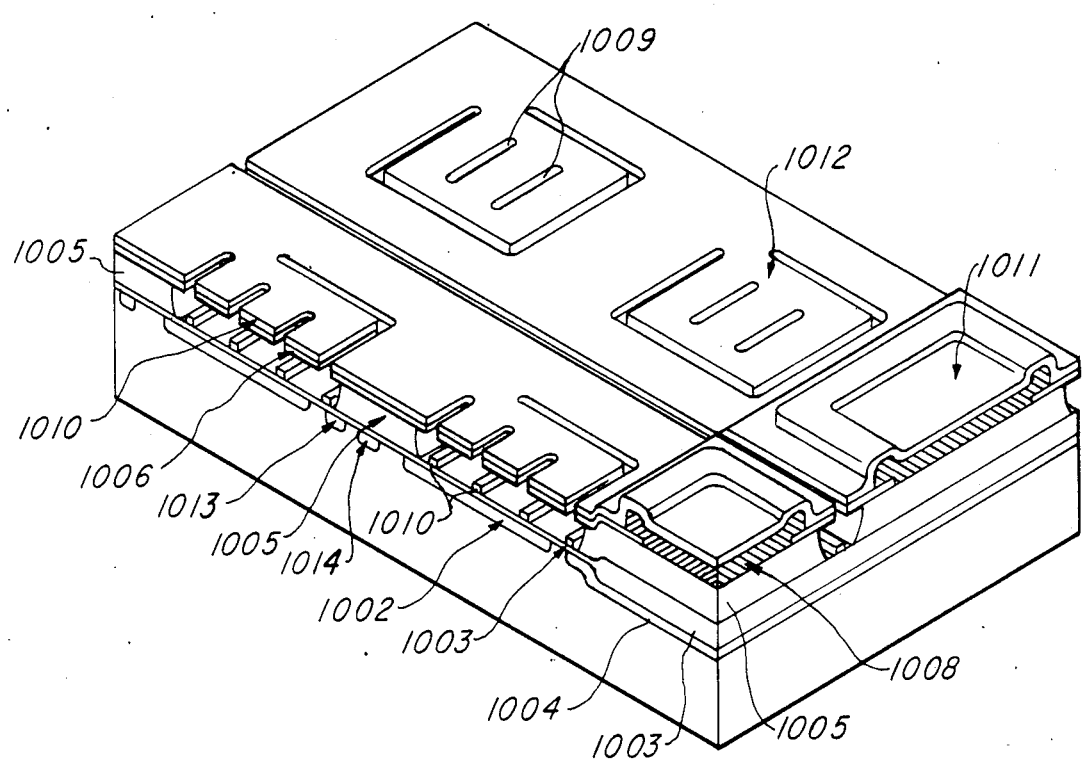

FIGS. 9 to 12 illustrate a manner in which mirror cell array 801 may be formed of individual deformable mirror cells. FIG. 9 illustrates a mirror cell structure having a flexible membrane laid over a charge storage cell. This deformable mirror structure is more fully described in copending U.S. patent application Ser. No. 386,141 filed June 7, 1982 entitled "Deformable Mirror Light Modulator" by Larry Hornbeck, now U.S. Pat. No. 4,441,791 issued Apr. 10, 1984, which is a continuation of U.S. patent application Ser. No. 183,595 filed Sept. 2, 1980 and now abandoned. FIGS. 10 to 12 illustrate an alternative structure using a cantilever beam for the deformaable mirror. This cantilever beam is formed employing an undercut etch as further described below in conjunction with the description of the matter illustrated in FIGS. 10 to 12.

FIG. 9 illustrates a cross-sectional view of one embodiment of the mirror cells of the deformable mirror device as constructed in accordance with the present invention. In FIG. 9, the deformable mirror device therein illustrated coprises a substrate 910 of semiconductor material of one conductivity type, such as P-type silicon. An insulating layer 911 of silicon dioxide covers the active surface of the semiconductor substrate 910. Self-aligned P+ channel stops with an overlying thick field oxide (not shown) are formed outside of the active area of the semiconductor substrate 910. The latter moat geometry serves to keep photo-induced leakage currents out of the active surface area of the semiconductor substrate 910 and to lower lead capacitance and cross-talk.

Channel stops 912 of the same conductivity type as that of the semiconductor substrate 910 but of increased dopant concentration and drain regions 913 of the other conductivity type are provided within the active surface area of the semiconductor substrate 910 by diffusion or ion implantation techniques. Thus, the channel stops 912 may be P+ regions within the P-type silicon substrate 910 and the drain regions 913 may be N+ type regions. The channel stops 912 are provided on opposite sides of the drain regions 913 in spaced relationship with respect thereto and serve to electrically isolate the drain regions 913.

A second doped region 914 of the same other conductivity type (i.e. N+ conductivity) as the drain regions 913 is provided in the semiconductor substrate 910, extending generally between one of the channel stops 912 and the drain region 913 but being disposed in laterally spaced relationship with respect to the drain region 913. The second doped regions 914 of the other conductivity type cooperate with the drain regions 913 to form enhancement mode field effect address transistors arranged in an x-y matrix array and may be formed simultaneously therewith in a selective ion-implantation procedure. Appropriate contacts to the drain regions 913 which define diodes (not shown) with the semiconductor substrate 910 of opposite conductivity type are provided.

The transistor gate structure for the matrix array of field effect address transistors is defined by a patterned layer of polycrystalline semiconductor material, such as polysilicon where the semiconductor substrate 910 is P-type silicon, which has been appropriately doped to be electrically conductive. The respective polysilicon transistor gate structures 915 are included within a grid configuration of polysilicon material. An insulating layer 916 of silicon dioxide is disposed atop the respective polysilicon transistor gate structures 915 which are also provided with sidewall oxide layers 917 of silicon dioxide. The respective oxide layers 916 on the polysilicon transistor gate structures 915 have overhanging marginal portions extending beyond the corresponding boundaries of the sidewalls of the polysilicon gates 915.

Electrically conductive contact members or pads 920 of a suitable metal, such as gold, are provided on the respective polysilicon transistor gate structures 915, the contact members 920 being disposed on the oxide layers 916 in overlying relationship thereto and to the polysilicon transistor gate structures 915 therebeneath. An x-y matrix array of metallic field plates 921 is provided, each of the field plates 921 being disposed on the oxide layer 911 of the substrate 910 and overlying the second doped region 914 of the other conductivity type for each of the field effect address transistors of the x-y matrix array. Thus, each field plate 921 in the array of metallic field plates 921 is respectively located in registration with one of the openings provided by the polysilicon grid structure which defines the polysilicon transistor gates 915.

Completing the deformable mirror device is a metallized membrane structure or deformable mirror mounted on the polysilicon grid of polysilicon transistor gate structures 915 and disposed in spaced relationship with respect to the substrate 910 and the array of metallic field plates 921. The metallized membrane structure includes a non-metallic carrier layer 925 of flexible material for supporting a light-reflective metallic coating or layer, the flexible non-metallic carrier layer 925 enabling the metallic coating or layer to be sufficiently thin for deflecting repeatedly without fatigue over a predetermined deflection range. Thus, the metallized membrane structure includes at least one metal layer which is light-reflective mounted on a non-metallic carrier layer 925 preferably formed of a polymer of nitrocellulose of the order of 800 Angstroms thick. If only one metal layer is provided with the non-metallic carrier layer 925, the metal layer would be the lower layer for contact with the contact members or pads 920 on the transistor gate structures 915.

The top surface of the non-metallic carrier layer 925 of a nitrocellulose polymer has a light-reflective metal layer 926 disposed thereon, this metal layer 926 preferably being antimony of approximately 400 Angstroms thick. A back-up metal layer is also provided on the bottom surface of the nitrocellulose carrier layer 925, the back-up metal layer being of two-ply construction and including a metal layer 930 directly adhered to the nitrocellulose carrier layer 925, preferably of the same metal, antimony, as the light-reflective top metal layer 926 and being approximately 400 Angstroms thick. A thinner layer of non-oxidizing, low contact resistance metal 931, preferably gold, is adhered to the lower antimony layer 930 and completes the two-ply metal back-up layer affixed to the nitrocellulose carrier layer 925. The thinner gold layer 931 provides good contact to the gold contact pads 920 on the field address transistor gates.

The metallized membrane structure including the polymer of nitrocellulose as the material of the non-metallic carrier layer 925 and at least one metal layer disposed on the bottom surface of the non-metallic carrier layer 925 is molecularly bonded to the contact members 920 of the polysilicon transistor gate structures 915 without requiring a separate bonding agent. The at least one metal layer of the metallized membrane structure serves as a field plate member in combination with the x-y matrix array of field plate members 921 disposed on the gate oxide 911 of the silicon substrate 910 which serve as the other field plates of an array of air gap capacitors, the individual air gaps 932 being defined by the space between the metallized membrane structure and the respective metallic field plate members 921 as mounted on the gate oxide 911 of the silicon substrate 910. The metallized membrane structure or deformable mirror is deflected in response to a voltage drop across respective air gaps 932. Thus, a deformable mirror device is provided in which an array of air gap capacitor cells may be line-addressed by field effect address transistors as formed on the silicon substrate 910.

FIGS. 10, 11 and 12 illustrate the construction of the mirror cells of a deformable mirror device having a cantilever beam mirror. This construction is considered an alternative to the membrane mirror cell construction illustrated in FIG. 9.

FIG. 10 illustrates an intermediate step in the construction of the cantilever beam mirror cell deformable mirror device. FIG. 10 illustrates substrate 1001 formed of an impurity doped silicon. Embedded within substrate 1001 are implanted layers of opposite conductivity type such as 1002, which serves as a floating source, and 1004 which serves as a buried or implanted conductor. These structures are covered with an oxide layer 1003 which serves as an etch stop in the final etch step in construction of this deformable mirror device. A thick polysilicon layer 1005 is then formed over the entire surface of the semiconductor device. On top of this polysilicon layer, a patterned oxide layer 1006 is formed. A thick aluminum pad 1008 is formed over portions of this oxide layer 1006 to be in ohmic contact with the polysilicon layer 1005. These structures will be employed for the bonding pads for the integrated circuit. Note that oxide layer 1006 includes a plurality of slots 1009 in each cantilever beam structure. These slots 1009 formed in cantilever beam mirror 1012 are more clearly illustrated in FIG. 12. As will be explained more fully below, openings 1009 within cantilever beam structure 1012 are formed to aid in the etching process forming cantilever beams 1002.

After formation of the structure illustrated in FIG. 10, the silicon slice containing these structures is cleaned and cut into individual integrated circuit chips. This cutting and cleaning process takes place at this point because it has been found that this process damages a substantial number of cantilever beams 1012 if this process takes place after the undercut etch.

Once the individual integrated circuit chips have been separated and cleaned, they are subjected to an anisotropic plasma etch. This anisotropic plasma etch does not effect oxide layer 1006 or thick aluminum pad 1008. However, this anisotropic plasma etch substantially erodes the thick polysilicon layer 1005. This plasma reaches thick polysilicon layer 1005 through the openings around the edge of cantilever beams 1012 and through openings 1009 within the cantilever beams 1012. The plasma etchant is also stopped by oxide layer 1003. By proper timing of the length of time that the integrated circuit chips are subjected to this plasma etchant, a structure having the thick polysilicon layer 1005 removed from underneath cantilever beams 1012 is constructed. In this regard it should be noted that openings 1009 are placed within cantilever beam 1012 in order to allow access of the plasma etchant to the polysilicon layer 1005 to speed the removal process. In the absence of openings 1009, it would be necessary to subject the integrated circuit chip to the plasma etchant for a longer period in order to completely clear polysilicon layer 1005 from beneath cantilever beam 1012. This process would permit the plasma etchant to undercut the structure adjacent to the individual mirror cells to a greater degree resulting in a consequent weakening of the final structure.

After the polysilicon layer 1005 has been etched, the entire integrated circuit device is given an aluminum coat 1010. This aluminum coat falls over the entire integrated circuit but particularly falls upon the top surface of cantilever beam 1012. It should also be noted as illustrated in FIGS. 11 and 12 that this deposited aluminum layer penetrates openings 1009 to be deposited underneath cantilever beam 1012. This deposited aluminum layer serves as a major surface to reflect light and particularly to enable cantilever beam structure 1012 to control the direction of the reflected light. It should be noted that both the anisotropic plasma etch and the final deposition of the aluminum layer 1010 are unpatterned operations, that is, they do not require critical dimensioning relative to the structures within the integrated circuit.

A cutaway perspective view of the completed structure formed in this manner is illustrated in FIG. 12. Note that FIG. 12 also illustrates channel stops 1013 and implanted drain regions 1014 corresponding to channel stops 912 and implanted drain regions 913, respectively, illustrated in FIG. 9. FIG. 12 also illustrates bonding pad 1011 formed by the presence of the aluminum layer 1010 formed on top of the thick aluminum pad 1008. Note that the patterning of the oxide layer 1006 causes these bonding pads to be electrically separate. Cantilever beams 1012 are electrically deflected corresponding to the magnitude of the charge stored in the floating source regions 1002 in a manner similar to the deflection of the membrane discussed in conjunction with FIG. 9.

Figure 13:
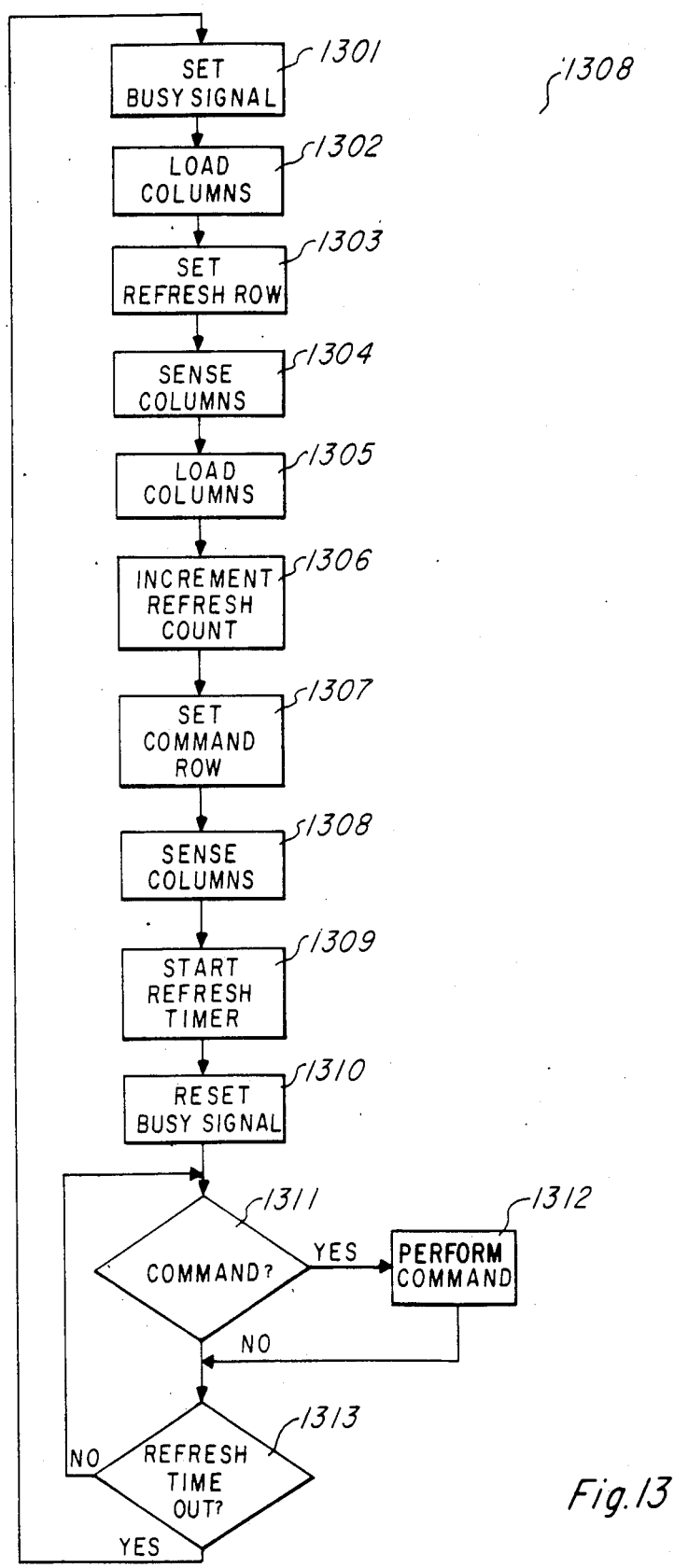
FIG. 13 illustrates the preferred embodiment of the operating sequence of the single chip deformable mirror device illustrated in FIG. 8.

FIG. 13 illustrates program 1300 which details the sequence of operations performed by the deformable mirror device illustrated in FIG. 8. In accordance with the present invention, it is preferable that all of the structures illustrated in block diagram 800 of FIG. 8 are embodied in a single integrated circuit chip. This is believed advantageous in order to reduce the number of terminals required to interface with the deformable mirror device. For example, if a mirror cell array employing 200 rows of 256 columns had a terminal for each of these lines, a total of 456 terminals would be required. However, in accordance with the present invention the inherent memory feature of the mirror cell array may be employed to permit a great reduction in the number of terminals required. In the preferred embodiment, an eight-bit data port 810, a three-bit instruction bus 812 and a single busy line 815 enable transfer of all necessary data for operation of deformable mirror device 800. The operation of the deformable mirror device illustrated by block diagram 800 will now be given in conjunction with program 1300 illustrated in FIG. 13.

It should be understood that control of the operation of deformable mirror device 800 in accordance with the program 1300 is under control of instruction decoder and sequencer 813 illustrated in FIG. 8. As will become clear from the detailed explanations appearing below, the deformable mirror device 800 preferably operates to alternate between an automatic mirror cell array refresh mode and a command responsive mode. These commands are transmitted to deformable mirror device 800 via instruction bus 812.

The automatic refresh portion of program 1300 begins by setting the busy signal (processing block 1301). This is accomplished by instruction decoder and sequencer 813 causing a predetermined digital signal to be applied to busy line 815. This predetermined digital signal level on busy line 815 informs devices external to deformable mirror device 800 that deformable mirror device 800 will not be responsive to received commands. This signal permits the external devices which communicate with deformable mirror device 800 to suspend transmission of commands until the deformable mirror device is again responsive to such commands.

Instruction decoder and sequencer 813 next causes a column of data to be loaded into mirror cell array 801 (processing block 1302). This is accomplished by causing the data within column latch 809 to be applied to column driver 807 for application to mirror cell array 801. In conjunction with the particular row 802 selected by row decoder driver 803, the mirror cells within the selected row are provided with an analog signal corresponding to the digital data stored within column latch 809. As noted above, it is considered preferable to permit four differing states for each mirror cell within mirror cell array 801. Column latch 809 includes a two-bit memory for each column of mirror cell array 801. In the preferred embodiment there are 256 columns within mirror cell array 801 and therefore there are 256 two-bit memories within column latch 809. The two bits of data stored within each memory latch of column latch 809 are applied to a corresponding two-bit digital to analog converter within column driver 807 for application to the individual column lines connected to mirror cell array 801.

Program 1300 next sets the refresh row (processing block 1303). This is accomplished by transferring the data from refresh counter 805 to row decoder driver 803, thereby setting the individual row conductor 802 selected by row decoder driver 803 to that indicated by the data within refresh counter 805.

Program 1300 next senses the state of the mirror cells within the selected row (block 1304). The individual row conductor 802 selected by row decoder driver 803 enables column sensor 808 to detect the amount of charge stored within these mirror cells via column conductors 806. As stated previously, column sensor 808 preferably includes a two-bit analog to digital converter for each of the column conductors 806. Thus, the amount of charge stored within an individual mirror cell in the selected row is converted into a two-bit code by column sensor 808. As noted above, the reference levels within the analog to digital converters must be able to unambiguously distinguish the charge levels even after some degradation due to charge leakage. This two-bit code is then stored in a corresponding two-bit memory within column latch 809. Thus the data stored within column latch 809 now corresponds to the sensed charge level within the mirror cells of the selected row.

Program 1300 next loads the mirror cells within the selected row with charge corresponding to the data stored within column latch 809 (processing block 1305). This process takes place in the same manner as previously described in processing block 1302. That is, the data stored within column latch 809 is applied to column driver 807, converted into an analog level corresponding to the digital data and then stored within the selected row of mirror cell array 801. Because the individual row conductor 802 selected by row decoder driver 803 has not been changed since the charge level of the individual mirror cell within the same row was sensed, this loading of the selected row serves to refresh the charge states within that row.

Program 1300 next increments the refresh count (processing block 1306). This is performed by adding one to the data stored within refresh counter 805. In the event that refresh counter 805 includes some excess codes, that is the number of bits stored within refresh counter 805 is greater than that necessary to uniquely specify each of the row conductors 802, then this step of incrementing the refresh counter also includes some manner of resetting refresh counter to avoid storing such an excess code in refrresh counter 805. By incrementing the data stored within refresh counter 805 in this manner, deformable mirror device 800 is then ready to refresh the next following row of mirror cells within mirror cell array 801 when program 1300 again enters processing block 1301.

Program 1300 then resets row decoder driver 803 to the command row (processing block 1307). This is performed by reloading into row decoder driver 803, the data corresponding to a command row. This data was stored in command row counter 811 during the time in which the automatic refresh was taking place. This process serves to again select the individual row conductor 802 previously selected prior to the automatic refresh operation.

Program 1300 next senses the data within the selected row of mirror cell array 801 (processing block 1308). This process is performed in the same manner as previously described in processing block 1304. As a result of this sensing operation, the data stored within column latch 809 corresponds to the charge state of the mirror cells in the selected row.

Program 1300 next starts refresh timer 814 (processing block 1309). Refresh timer 814 is a part of instruction decoder and sequencer 813. Refresh timer 814 serves to indicate to deformable mirror device 800 when it is necessary to refresh an additional row within mirror cell array 801. The length of time of refresh timer 814 is selected in order to enable refresh of each of the rows within mirror cell array 801 before the decay of the charge stored within any mirror cell would prevent unambiguous recovery of the data represented by the amount of charge stored.

Program 1300 then resets the busy signal (processing block 1310). This is accomplished by instruction decoder and sequencer 813 releasing the predetermined signal level from busy line 815. This reset of the busy signal serves to notify any external devices that deformable mirror device 800 is now responsive to command inputs.

Program 1300 next checks to determine whether a command input has been received (decision block 1311). This determination is made by instruction decoder and sequencer 813 and involves determination of whether a command has been received on instruction bus 812. In the case in which a command has been received, then this command is executed (processing block 1312). The operation of deformable mirror device 800 in response to these commands is more fully described below.

If a command input has not been received or if such a command input has been received and executed, then program 1300 checks to determine whether the time of refresh timer 814 has expired (decision block 1313). In the event that the time of refresh timer 814 has not expired, then program 1300 returns to decision block 1311 to again test for a command input. If the time of refresh timer 814 has expired, then it is necessary to refresh another row within mirror cell array 801 in order to prevent decay of the charge stored within that row, and consequent errors in the display produced on the viewing screen. In this event, program 1300 again returns to processing block 1301 in order to begin the automatic refresh sequence.

As stated previously, instruction decoder and sequencer 813 is preferably responsive to a three-bit instruction from instruction bus 812 in order to enable an external device to control the operation of deformable mirror device 800. The following instructions to be executed by deformable mirror device 800 are proposed; load row address, load column address, load data type, write data, load column and read data. The operation of this invention in conjunction with each of these instructions appears below. A load row address instruction is employed with eight data bits received from data port 810. In response to a load address instruction, instruction decoder and sequencer 813 permits this received eight bits of data to be applied via 804 to row decoder driver 803. This load addrress instruction preferably also causes the data received from data port 810 to be stored in command row counter 811. This instruction thereby enables an external device to cause row decoder driver 803 to select an individual one of row conductors 802 coupled to a row of mirror cells.

In response to a load column address command, instruction decoder and sequencer 813 transfers data received from data port 810 to pointer 818 via bus 804. In the preferred embodiment, eight data bits are transferred from data port 810 to pointer 818. These eight data bits are applied to column select decode 819 in order to select the start position within column latch 809 where data is to be written.

The load data type command transfers data received from data port 810 to shade latch 816 and mask 817. Shade latch 816 and mask 817 are used to control the data transferred to column select decode 819 for writing into column latch 809. Four of the bits received from address bus 810 are stored within shade latch 816. These four bits are divided into two groups of two bits. In accordance with the preferred embodiment, each mirror cell within mirror cell array 801 has four separate states which can be specified by two bits. Shade latch 816 stores two of such two-bit states. These two-bit states stored within shade latch 816 are employed to specify the background and foreground shades to be transferred to column latch 809.

Three additional bits of the eight bits received on data port 810 are used to specify the number of data bits via mask 817. Mask 817 receives these three bits and provides a mask for any number of data bits from one to eight for storage within column latch 809 upon a write data instruction. Thus a load data type command in conjunction with the eight data bits applied to data port 810 specifies two different shades stored within shade latch 816 and the number of data bits to be transferred to column latch 809 stored in mask 817.

A write data instruction causes instruction decoder and sequencer 813 to control the transfer of data from data port 810 to column latch 809. Column select decode 819 enters data into column latch 809 in accordance with the data received from data port 810 and the state of shade latch 816, mask 817 and pointer 818. Each "0" within the eight bits received from data port 810 during a write data command causes the two bits stored within the background latch of shade latch 816 to be applied to column latch 809. Similarly, each "1" bit received causes the two bits within the foreground latch of shade latch 816 to be applied to column latch 809. The number of bits transferred is controlled by the previously set state of mask 817 and may be any number from one to eight. The starting position, that is the first column location within column latch 809 where this new data is stored is controlled by the state of pointer 818. Thus, a combination of commands permits an external device to store the desired data within column latch 809.

Upon receipt of a load column command, the column data stored within column latch 809 is applied to the selected row within mirror cell array 801 via column driver 807. Thus, each mirror cell within the selected row of mirror cell array 801 is driven to the state corresponding to the two bits stored within the associated two bit memory in column latch 809. This load column command may be provided as a separate instruction, enabling column latch 809 to be written into in several places prior to transferring this data to a particular row in mirror cell array 801. In the alternative, the data stored within column latch 809 may be used to provide the desired charge within the selected row of mirror cell array 801 for each write data command. If this is the case, the write data command enables performance of both of these functions.

It is believed desirable in some instances to be able to recall data stored within mirror cell array 801 for use by the external device, for example for concatenation with additional data. A read data command may be provided to perform such a function. Upon receipt of a read data command, instruction decoder and sequencer 813 causes the data corresponding to four of the two-bit memories within column latch 809 to be transferred to bus 804 and out via data port 810. The dotted line bus between column latch 809 and bus 804 permits this data transfer. The four particular two-bit data locations from column latch 809 are specified by the data stored in pointer 818, which specifies the first of these four memory locations.

In conjunction with the external commands applied to deformable mirror device 800, it should be noted that some of the steps shown in program 1300 illustrated in FIG. 13 are provided to make it easier for the external device to control deformable mirror device 800. For example, the load column command (processing block 1307), the set command row (processing block 1308) and the sense column command (processing block 1308) are not required for complete control of all of the operations of deformable mirror device 800. These commands are provided in program 1300 in order to place the deformable mirror device 800 in the same state after the automatic refresh operation as before. This is done by loading the data stored within column latch 809 into mirror cell array 801 at the column specified by the command column and then recalling this data for storage within column latch 809 at the command column after the automatic refresh operation. In this event, the external device does not need to be cognizant of the refresh cycle of deformable mirror device 800, but rather need only refrain from issuing commands during the generation of the busy signal. On the other hand, if it is considered advantageous for the external device to be cognizant of the refresh cycle, then these operations in the refresh sequence may be omitted. However, the external device must recognize that the state of deformable mirror device 800 after the automatic refresh function differs from the state prior to this function.

Although the foregoing description of block diagram 800 has referred to mirror cell array 801 as formed of a plurality of deformable mirror cells, the utility of this description does not require this. The above description would be equally applicable if mirror cell array 801 were any spatial light modulator with individual charge storage or voltage storage cells.

Figure 14:
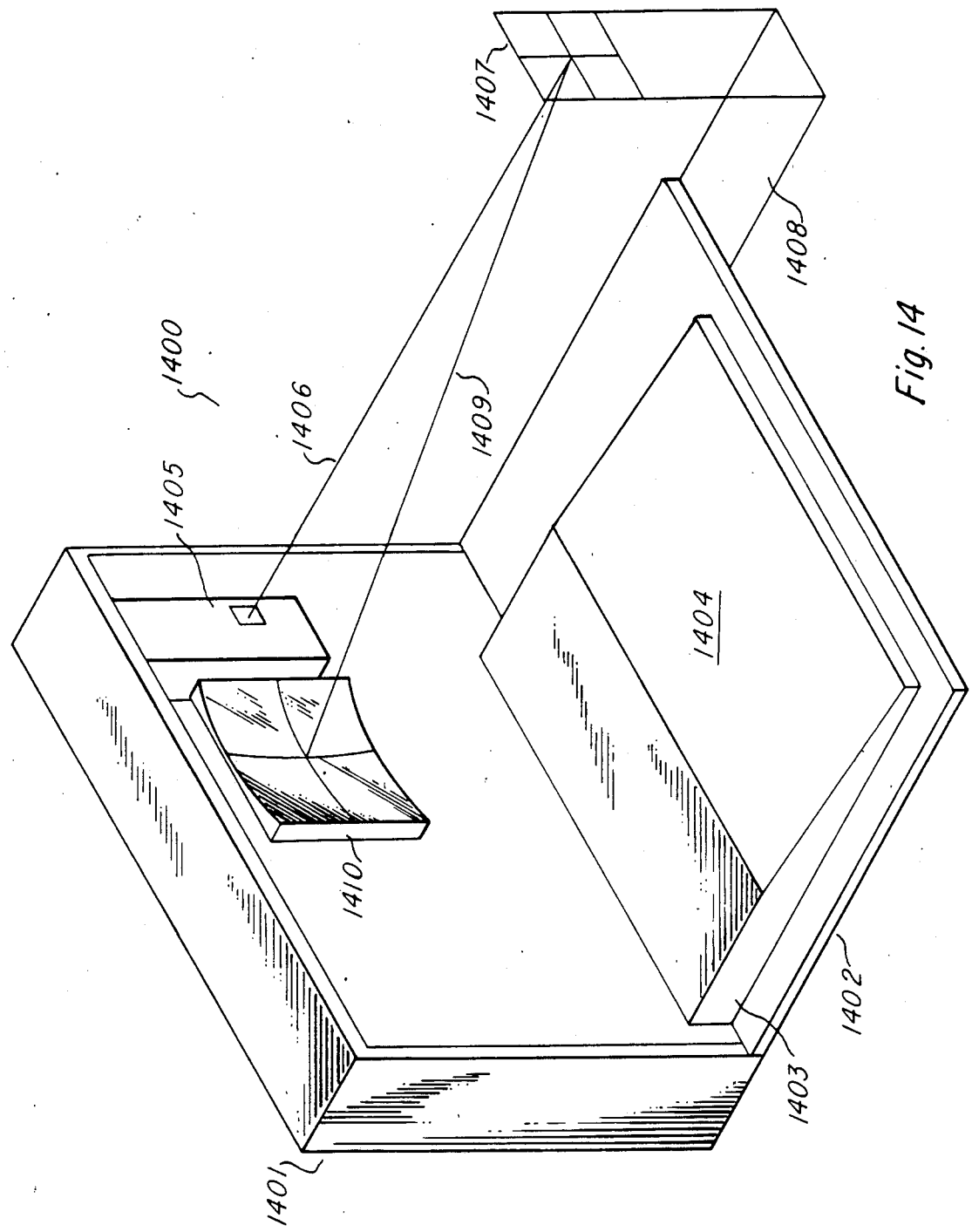
FIG. 14 illustrates the preferred embodiment of a portable display system in accordance with the present invention.

FIG. 14 illustrates construction 1400, which is a preferred embodiment of the mechanical construction of a deformable mirror device projected display of the present invention. Construction 1400 includes external case 1401 which has a drop door 1402. Mounted upon drop door 1402 is a small computer system or terminal 1403. This small computer system or terminal 1403 includes keyboard area 1404 which includes the individual keys for data and instruction entry (not illustrated).

Also included within construction 1400 is optical projector 1405. This optical projector 1405 may have a construction such as illustrated in FIGS. 1, 5 or 7. Light from optical system 1405 follows path 1406 to mirror 1407. Mirror 1407 is mounted on pullout stand 1408 which is further attached to drop door 1402. Light from path 1406 is reflected by mirror 1407 to path 1409 and hence to the viewing screen 1410.

Figure 15:
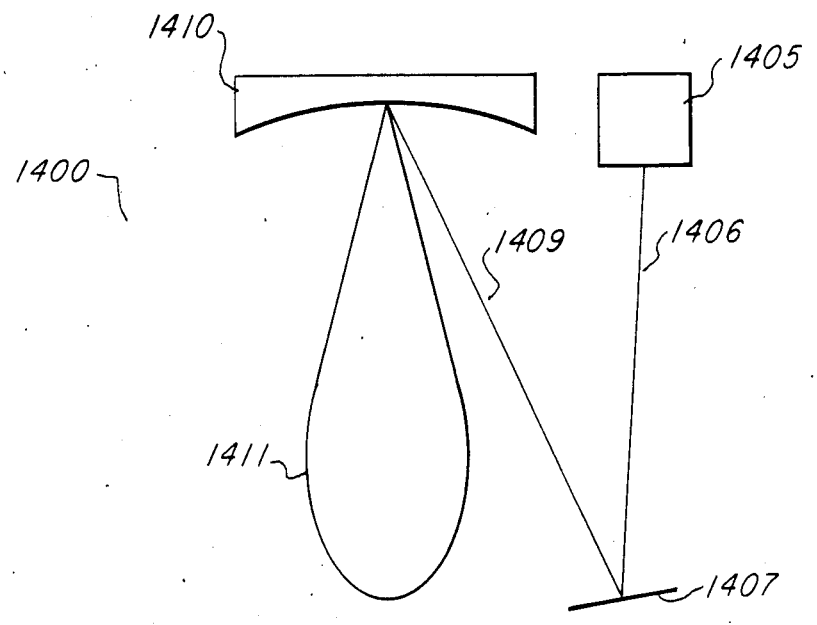
FIG. 15 illustrates the provision of a high gain screen in the portable display system illustrated in FIG. 14.

An additional view of the optical system is provided in FIG. 15, which further illustrates an additional feature of the present invention. In accordance with a preferred embodiment of the present invention, viewing screen 1410 includes a high gain feature, that is, the light reflected from viewing screen 1410 is not uniformly scattered but rather falls within a relatively narrow range of angles.

As illustrated in FIG. 15, optical system 1405 projects light on light path 1406 to mirror 1407. This light is reflected along light path 1409 to viewing screen 1410. The viewing screen 1410 is so curved and constructed in order to provide a reflection of the light received from optical system 1405 along main lobe 1411. Because it is expected that the viewer will be seated so that his hands may be placed upon keyboard area 1404, it is a simple matter to provide main lobe 1411 in the direction of the expected viewing position. By providing a concentration of the light received from projector 1405 onto a relatively narrow range of angles such as illustrated in FIG. 15, it is possible to achieve the same perceived light intensity at the screen with a reduced light source intensity.

Figure 18:
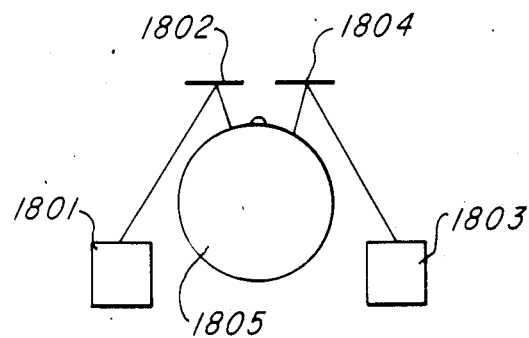
FIGS. 16, 17 and 18 illustrate alternative embodiments of a three-dimension projection system in accordance with the present invention.
Figure 17:
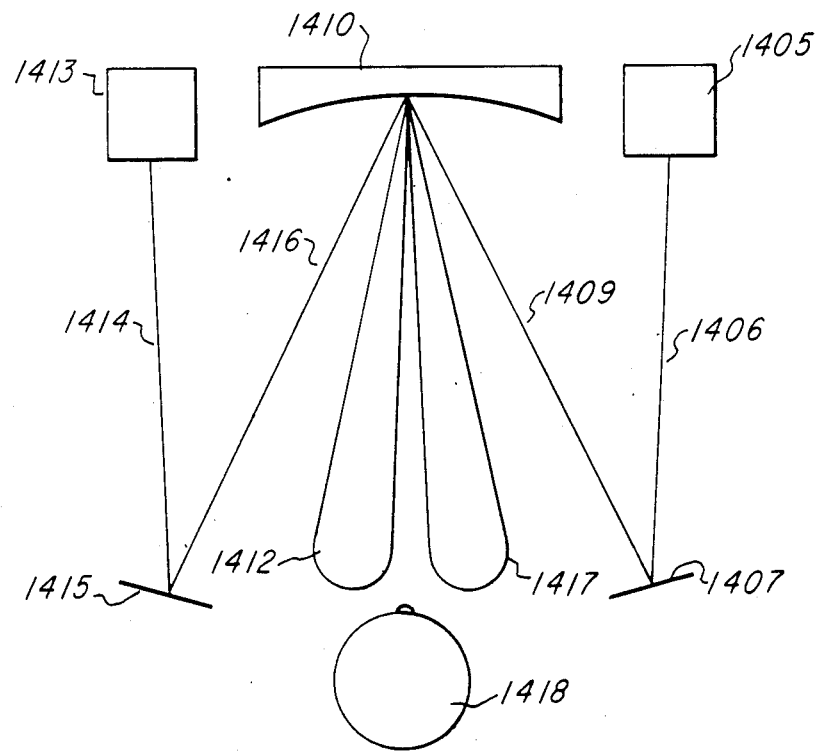
Figure 16:
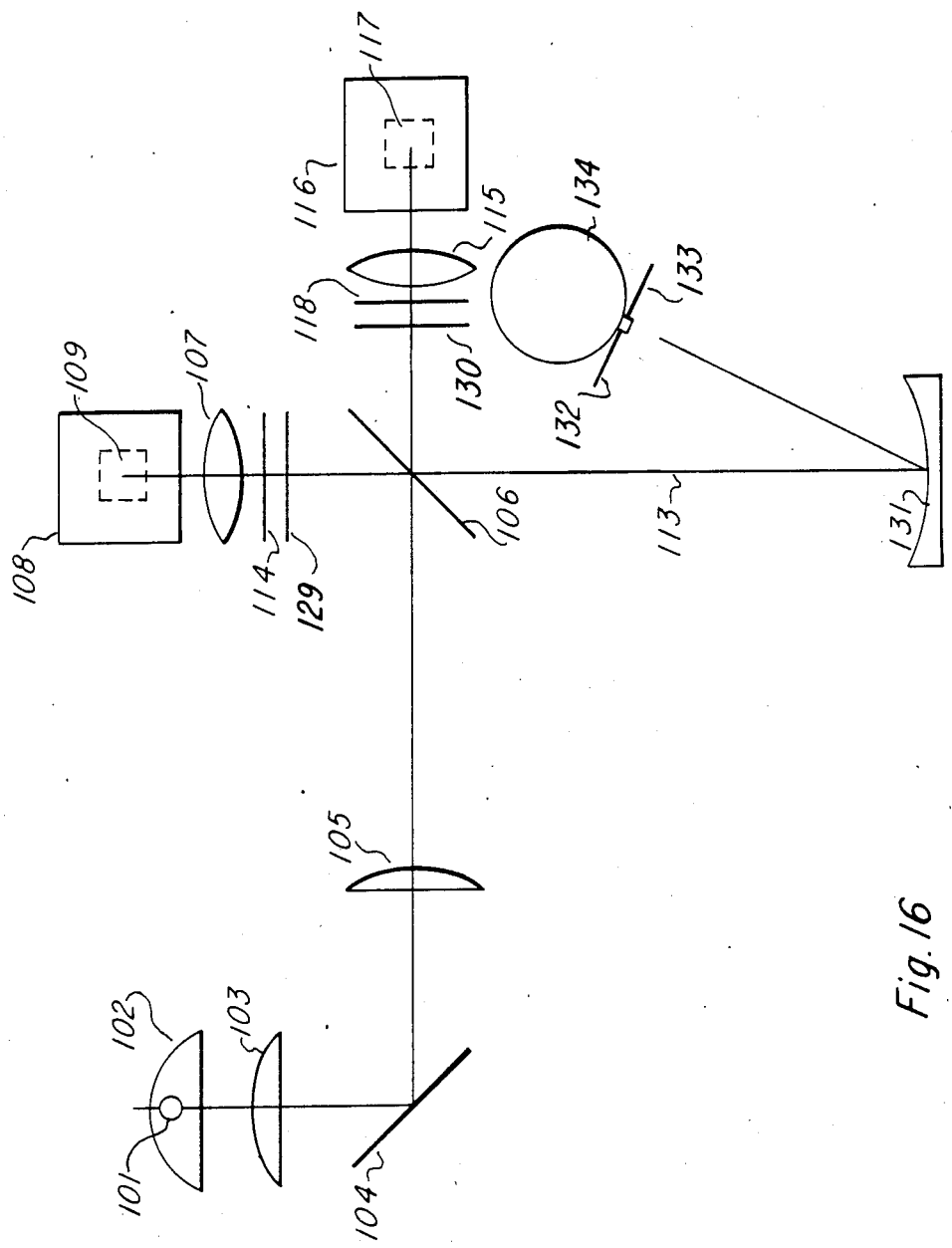

FIGS. 16, 17 and 18 disclose three differing methods in which a three-dimensional display may be achieved via this deformable mirror device display system.

FIG. 16 illustrates a three-dimensional display system employing a single projection system. The projection system illustrated in FIG. 16 corresponds substantially to that illustrated in FIG. 5 with the addition of filters 129 and 130. Filters 129 and 130 are polarizing filters which transmit only light having a particular polarization. In the preferred embodiment, the direction of polarization of filters 129 and 130 is orthogonal. This light is projected along light path 113 to viewing screen 131 and hence to the viewer at viewing position 134. Additional polarizing filters 132 and 133 are employed between the viewing screen and the individual eyes of the viewer in order to separate the two differing images from deformable mirror device 109 and deformable mirror device 117 in accordance with their respective polarizations. It is believed that the provision of separate color filters 114 and 118 for these differing images will not prevent the user from integrating this into a single three-dimensional color image.

FIG. 17 illustrates an additional three-dimensional projection system employing two optical systems but which does not require any special filters between the user and the viewing position. Light from optical system 1405 follows path 1406 to mirror 1407 and is reflected by the mirror 1407 along a path 1409 to viewing screen 1410. This light then forms main lobe 1412, which is preferably over a narrower set of angles than main lobe 1411 illustrated in FIG. 15. In addition, a optical system 1413 provides light on path 1414 to mirror 1415 which reflects it via path 1416 to viewing screen 1410. This light is then concentrated onto a relatively narrow set of angles illustrated by main lobe 1417.

Because of the requirement that the hands of the observer must be able to reach keyboard 1404, the possible viewing positions 1418 are severely limited. Therefore, it is possible to provide main lobes 1412 and 1417 aimed precisely at the expected eye positions of the observer at viewing position 1418. Thus, the two eyes of the observer each receive a differing image due to the narrow beam lobes permitting the projection of a three-dimensional image.

FIG. 18 illustrates a third technique for generating a three-dimensional image using deformable mirror device projection display systems. FIG. 18 illustrates a first projector 1801 which provides light to a first viewing screen 1802. A second projector 1803 provides light to a second viewing screen 1804. The respective viewing screens 1802 and 1804 are provided in proximity to the expected eye positions of the observer at viewing position 1805. These viewing screens 1802 and 1804 are so close to the individual eye positions at the viewing position 1805 as to substantially eliminate viewing by the opposite eye. By this means, a differing image can be provided to each eye of the observer, thereby enabling a three-dimensional image to be formed.

What is claimed is:

1. An electronic display device comprising:
 a light source;
 a first optical system for forming a substantially collinear beam of light from said light source;
 a Schlierin optical device having alternating reflecting and transmitting portions for forming respective reflecting and transmitting optical paths, said Schlierin optical device disposed to receive light from said first optical system at an angle;
 a second optical system disposed to receive light from one of said reflecting or transmitting optical paths of said Schlierin optical device for focusing light received from said Schlierin optical device to a focal point;
 a deformable mirror device disposed near said focal point for receiving light from said source optical system, said deformable mirror device having a matrix of a plurality of individually electrically deformable mirror cells, each mirror cell normally reflecting light received from one type of said reflecting and transmitting portions of said Schlierin optical device back to similar type portions and being electrically deformable to reflect at least some light received from one type of said reflecting and transmitting portions of said Schlierin optical device back to another type of said reflecting and transmitting portions of said Schlierin optical device;
 a nonreciprocal optical device disposed between said light source and said Schlierin optical device for transmitting more light from said light source to said Schlierin optical device than reflected back to said light source and for reflecting more light back to said Schlierin optical device than transmitted from said Schlierin optical device to said light source; and
 a viewing screen disposed for receiving light reflected by deformed mirror cells of said deformable mirror device.

2. An electronic display device comprising:
 a light source;
 a first optical system for forming a substantially collinear beam of light from said light source;
 a Schlierin optical device having alternating reflecting and transmitting portions for forming respective reflecting and transmitting optical paths, said Schlierin optical device disposed to receive light from said first optical system at an angle;
 a second optical system disposed to receive light from one of said reflecting or transmitting optical paths of said Schlierin optical device for focusing light received from said Schlierin optical device to a first focal point;
 a first deformable mirror device disposed near said first focal point for receiving light from said second optical system, said first deformable mirror device having a matrix of a plurality of individually electrically deformable mirror cells, each mirror cell normally reflecting light received from one type of said reflecting and transmitting portions of said Schlierin optical device back to similar type portions and being electrically deformable to reflect at least some light received from one type of said reflecting and transmitting portions of said Schlierin optical device back to another type of said reflecting and transmitting portions of said Schlierin optical device;
 a third optical system disposed to receive light from the other of said reflecting or transmitting optical paths of said Schlierin optical device as compared to said one of said reflecting or transmitting optical paths of said Schlierin optical device disposed to be received by said second optical system for focusing light received from said Schlierin optical device to a second focal point;
 a second deformable mirror device disposed near said second focal point for receiving light from said third optical system, said second deformable mirror device having a matrix of a plurality of individually electrically deformable mirror cells, each mirror cell normally reflecting light received from one type of said reflecting and transmitting portions of said Schlierin optical device back to similar type portions and being electrically deformable to reflect at least some light received from one type of said reflecting and transmitting portions of said Schlierin optical device back to another type of said reflecting and transmitting portions of said Schlierin optical device; and
 a viewing screen disposed for receiving light reflected by deformed mirror cells of said first and second deformable mirror devices.

3. An electronic display device as claimed in claim 2, further comprising:
   a first filter disposed between said Schlierin optical device and said first deformable mirror device; and
   a second filter different from said first filter disposed between said Schlierin optical device and said second deformable mirror device.

4. An electronic display device as claimed in claim 3, wherein:
   one of said first or second filters is the primary color green and the other of said first or second filters has alternate portions of the primary color red and the primary color blue.

5. An electronic display device as claimed in claim 4, further comprising:
   a third filter disposed between said Schlierin optical device and said first deformable mirror device for transmitting only light polarized in a first direction; and
   a fourth filter disposed between said Schlierin optical device and said second deformable mirror device for transmitting only light polarized in a second direction orthogonal to said first direction.

6. An electronic display device as claimed in claim 5, further comprising:
   a fifth filter disposed between said viewing screen and a first one of an observer's eyes for transmitting only light polarized in said first direction; and
   a sixth filter disposed between said viewing screen and a second one of an observer's eyes for transmitting only light polarized in said second direction.

7. An electronic display device as claimed in claim 3, wherein:
   said first filter is a polarizing filter for transmitting only light polarized in a first direction; and
   said second filter is a polarizing filter for transmitting only light polarized in a second direction orthogonal to said first direction.

8. An electronic display device as claimed in claim 7, further comprising:
   a third filter disposed between said viewing screen and a first one of an observer's eyes for transmitting only light polarized in said first direction; and
   a fourth filter disposed between said viewing screen and the other one of an observer's eyes for transmitting only light polarized in said second direction.

9. An electronic display device as claimed in claim 2, wherein:
   said first deformable mirror device and said second deformable mirror device are aligned whereby individual mirror cells are disposed in a first direction in said first deformable mirror device and control the illumination of a first set of alternating spots on said viewing screen and individual mirror cells disposed in said first direction in said second deformable mirror device control the illumination of a second set of alternating spots disposed in said first direction on said viewing screen.

10. An electronic display device as claimed in claim 9, wherein:
   said Schlierin optical device comprises alternating stripes of reflecting portions and transmitting portions, said stripes disposed in said first direction.

11. An electronic display device comprising:
   a light source;
   a first optical system for forming a substantially collinear beam of light from said light source;
   a Schlierin optical device having alternating reflecting and transmitting portions for forming respective reflecting and transmitting optical paths, said Schlierin optical device disposed to receive light from said first optical system at an angle;
   a second optical system disposed to receive light from one of said reflecting or transmitting optical paths of said Schlierin optical device for focusing light received from said Schlierin optical device to a first focal point;
   a first deformable mirror device disposed near said first focal point for receiving light from said second optical system, said first deformable mirror device having a matrix of a plurality of individually electrically deformable mirror cells, each mirror cell normally reflecting light received from one type of said reflecting and transmitting portions of said Schlierin optical device back to similar type portions and being electrically deformable to reflect at least some light received from one type of said reflecting and transmitting portions of said Schlierin optical device back to another type of said reflecting and transmitting portions of said Schlierin optical device;
   an optical beam splitting device disposed to receive light from the other of said reflecting or transmitting optical paths of said Schlierin optical device for splitting said light into first and second optical paths;
   a third optical system disposed to receive light from said first optical path of said optical beam splitting device for focusing light received from said optical beam splitting device to a second focal point;
   a second deformable mirror device disposed near said second focal point for receiving light from said third optical system, said second deformable mirror device having a matrix of a plurality of individually electrically deformable mirror cells, each mirror cell normally reflecting light received from one type of said reflecting and transmitting portions of said Schlierin optical device back to similar type portions and being electrically deformable to reflect at least some of the light received from one type of said reflecting and transmitting portions of said Schlierin optical device back to another type of said reflecting and transmitting portions of said Schlierin optical device;
   a fourth optical system disposed to receive light from said second optical path of said optical beam splitting device for focusing light received from said optical beam splitting device to a third focal point;
   a third deformable mirror device disposed near said third focal point for receiving light from said fourth optical system, said third deformable mirror device having a matrix of a plurality of individually electrically deformable mirror cells, each mirror cell normally reflecting light received from one type of said reflecting and transmitting portions of said Schlierin optical device back to similar type portions and being electrically deformable to reflect at least some light received from one type of said reflecting and transmitting portions of said Schlierin optical device back to another type of said reflecting and transmitting portions of said Schlierin optical device; and
   a viewing screen disposed for receiving light reflected by deformed mirror cells of said first, second and third deformable mirror devices.

12. An electronic display system as claimed in claim 11, further comprising:
 a first color filter disposed between said Schlierin optical device and said first deformable mirror device;
 a second color filter disposed between said optical beam splitting device and said second deformable mirror device; and
 a third color filter disposed between said optical beam spltting device and said third deformable mirror device.

13. An electronic display device as claimed in claim 12, wherein:
 a first one of said first, second and third color filters is the primary color green, a second one of said first, second and third color filters is the primary color red and a third one of said first, second and third color filters is the primary color blue.

14. An electronic display system comprising:
 a first projection system including: (1) a first light source, (2) a first spatial light modulating means disposed to receive light from said first light source, said first spatial light modulating means having a plurality of individually electrically controllable modulator cells for modulating light received from said first light source, and (3) a first viewing means for spatially localizing light modulated by said first spatial light modulating means to a first one of an observer's eyes; said first viewing means comprises a first viewing screen disposed to be visible only to said first one of the observer's eyes for receiving light modulated by said first spatial light modulating means; and
 a second projection system including: (1) a second light source; (2) a second spatial light modulating means disposed to receive light from said second light source, said second spatial light modulating means having a plurality of individually electrically controllable modulator cells for modulating light received from said second light source, and (3) a second viewing means for spatially localizing light modulated by said second spatial light modulating means to a second one of an observer's eyes; said second viewing means comprises a second viewing screen disposed to be visible only to said second one of the observer's eyes for receiving light modulated by said second spatial light modulating means.

15. An electronic display system comprising:
 a first projection system including: (1) a first light source, (2) a first spatial light modulating means disposed to receive light from said first light source, said first spatial light modulating means having a plurality of individually electrically controllable modulator cells for codulating light received from said first light source, and (3) a first viewing means for spatially localizing light modulated by said first spatial light modulating means to a first one of an observer's eyes;
 a second projection system including: (1) a second light source, (2) a second spatial light modulating means disposed to receive light from said second light source, said second spatial light modulating means having a plurality of individually electrically controllable modulator cells for modulating light received from said second light source, and (3) a second viewing means for spatially localizing light modulated by said second spatial light modulating means to a second one of an observer's eyes;
 a viewing screen visible to both said first and second ones of the observer's eyes;
 said first viewing means comprises a first filter disposed between said first light source and said viewing screen for transmitting only light polarized in a first direction and a second filter disposed between said viewing screen and said first one of the observer's eyes for transmitting only light polarized in said first direction; and
 said second viewing means comprises a third filter disposed between said second light source and said viewing screen for transmitting only light polarized in a second direction orthogonal to said first direction and a fourth filter disposed between said viewing screen and said second one of the observer's eyes for transmitting only light polarized in said second direction.

16. An electronic display system comprising:
 a first projection system including: (1) a first light source, (2) a first spatial light modulating means disposed to receive light from said first light source, said first spatial light modulating means having a plurality of individually electrically controllable modulator cells for codulating light received from said first light source, and (3) a first viewing means for spatially localizing light modulated by said first spatial light modulating means to a first one of an observer's eyes;
 a second projection system including: (1) a second light source, (2) a second spatial light modulating means disposed to receive light from said second light source, said second spatial light modulating means having a plurality of individually electrically controllable modulator cells for modulating light received from said second light source, and (3) a second viewing means for spatially localizing light modulated by said second spatial light modulating means to a second one of an observer's eyes;
 a viewing screen visible to both the first and second ones of the observer's eyes, said viewing screen having means for reflecting most of the light received from a light source at a particular angle to a narrow range of angles corresponding to said particular angle;
 said first viewing means comprises disposing said first projection system at a particular angle in relation to said vewing screen whereby light from said first projection system is reflected to a narrow range of angles corresponding to the location of the first one of the observer's eyes in the expected viewing position; and
 said second viewing means comprises disposing said second projection system at a particular angle in relation to said viewing screen whereby light from said second projection system is reflected to a narrow range of angles corresponding to the location of the second one of the observer's eyes in the expected viewing position.

* * * * *